United States Patent

[11] 3,632,128

[72] Inventor John E. Raidel
 Springfield, Mo.
[21] Appl. No. 861,037
[22] Filed Sept. 25, 1969
[45] Patented Jan. 4, 1972
[73] Assignee Ridewell Corporation
 Springfield, Mo.
 Continuation-in-part of application Ser. No. 670,262, Sept. 25, 1967, now Patent No. 3,471,165. This application Sept. 25, 1969, Ser. No. 861,037

[54] MULTIPLE JOINT TANDEM SUSPENSION
 8 Claims, 12 Drawing Figs.
[52] U.S. Cl. .................................................... 280/104.5 R, 267/21
[51] Int. Cl. ..................................................... B60g 5/02
[50] Field of Search .......................................... 280/104.5 A, 104.5 R; 267/21

[56] References Cited
UNITED STATES PATENTS
2,265,518 12/1941 Coote ........................... 280/104.5 A
3,241,856 3/1966 Raidel .......................... 280/104.5
3,471,165 10/1969 Raidel .......................... 280/104.5 A Primary Examiner—Philip Goodman
Attorney—Kingsland, Rogers, Ezell, Eilers & Robbins ABSTRACT: A tandem vehicle suspension having a compensator member pivotally supported on a transverse trunnion depending from a vehicle chassis, independent forwardly and rearwardly extending torque beams pivotally connected to the compensator at one end and to the forward and rearward axles, respectively, at their other ends. Shock absorbing members between the compensator and the torque beams and additional shock absorbing means between the two torque beams.

The torque beams are connected to the compensator by resilient bushings and to the axles by resilient trunnions or bushings with the result of automatic tracking by the wheels mounted on the axles. The resilient bushings connecting the torque beams to the compensator are on opposite sides of and below the transverse trunnion so that reacting moments and forces on stopping and starting the truck tend to drive the compensator downwardly, thereby reducing bouncing.

In one embodiment, the shock absorbing means between the two torque beams is a unitary elastomer spring with movement of one beam transmitted through the spring to the other beam. In another embodiment, the spring is secured at its center plate to the compensator to prevent any such transmission through the spring. In other embodiments these compressible members are air springs.

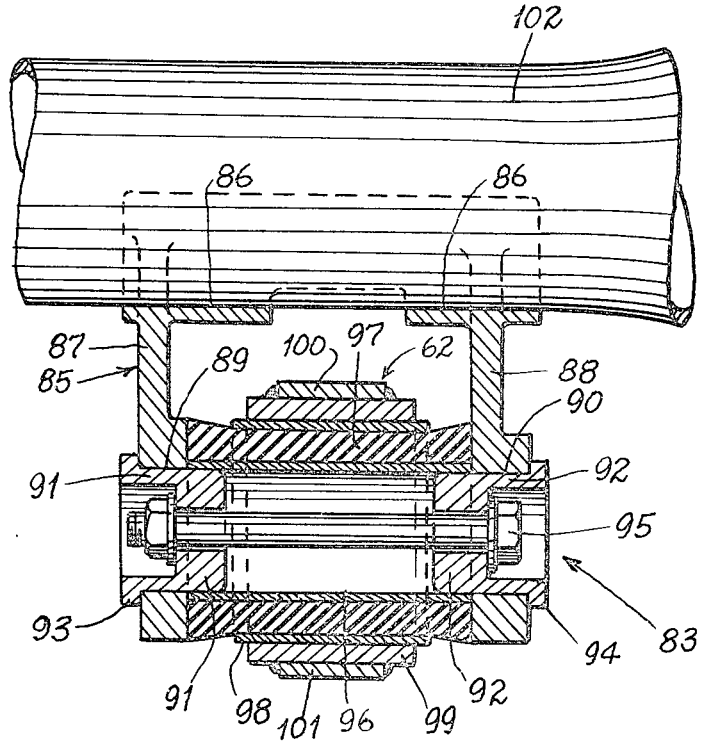

MULTIPLE JOINT TANDEM SUSPENSION

This application is a continuation-in-part of U.S. Pat. application, Ser. No. 670,262, filed Sept. 25, 1967, now U.S. Pat. No. 3,471,165 issued Oct. 7, 1969.

BRIEF DESCRIPTION OF THE INVENTION

On each side of the truck body, a pedestal is suspended from the chassis. A trunnion shaft is mounted between the pedestals, and a compensator in the form of an inverted U-shaped channel member is pivotally connected by a resilient bushing to each end of the trunnion shaft. Forwardly and rearwardly extending torque beams are pivotally connected by resilient bushings to the channel member and by resilient trunnions or bushings to the respective forward and rearward axles. The compensator oscillates independently from its trunnion pivot and equalizes the load distribution between the axles. The torque beams are pivoted to the compensator and axle brackets, providing the axles an independent axle movement. An elastomer spring, formed of metal plates separated by rubber blocks, is mounted between the upper side of the channel member and each torque beam.

In one embodiment of the invention another elastomer spring is mounted horizontally between vertical plates projecting upwardly from the torque beams, this spring being of a unitary type with movement of one beam translated through the spring to the other beam. The relative positions of the pivotal connections and of the elastomer springs is such that, each time a torque beam pivots or the compensator oscillates because of load changes, or load shifts, or because of shocks from uneven roadways, the torque beam and/or the compensator applies not only a compressive, but also a shear force to the elastomer springs resting on the torque beams.

In another embodiment, two horizontal elastomer springs are substituted for the single horizontal elastomer spring. A vertical center plate is welded to the compensator, and the horizontal springs bear against opposite sides of the center plate to prevent any translation of movement of one torque beam to the other directly through the spring. In this embodiment, therefore, the reaction to torque beam movement in one horizontal elastomer spring is not transferred to the other torque beam.

In other embodiments of the invention, air springs are substituted for the horizontal elastomer springs.

The bushing which connects the compensator to the trunnion shaft is above and between the bushings which connect the torque beams to the compensator. Therefore when the truck brakes are applied, the resulting moments and forces against the compensator are in a downward, rather than an upward, direction and are of sufficient magnitude to substantially reduce bouncing.

Also, since the connectors of the torque beams and the compensator are by resilient bushings, limited lateral swinging of the torque beams can take place when the vehicle makes a turn. The wheels automatically track with the turn, thereby reducing or eliminating skidding and providing a safer, more certain control of the truck.

DESCRIPTION OF THE DRAWINGS

FIG. 1 is a top plan view of the tandem suspension assembly;

FIG. 2 is a side elevation view of the tandem suspension assembly;

FIG. 3 is a rear end elevation view as viewed from the right end of FIG. 2 along the line 3—3;

FIG. 4 is an enlarged view in section taken along the line 4—4 of FIG. 2;

FIG. 5 is an enlarged view in section taken along the line 5—5 of FIG. 2;

FIG. 6 is an enlarged view in section taken along the line 6—6 of FIG. 2;

FIG. 7 is an enlarged view in section taken along the line 7—7 of FIG. 2;

FIG. 8 is a side elevation view of a modified form of the invention;

FIG. 9 is an enlarged view in section taken along the line 9—9 of FIG. 8;

FIG. 10 is a side elevation view of another modified form of the invention, with portions shown in section;

FIG. 11 is an enlarged view in section taken along the line 11—11 of FIG. 10; and FIG. 12 is a fragmentary side elevation view of still another modified form of the invention, with portions shown in section.

DETAILED DESCRIPTION OF THE INVENTION

The tandem suspension assembly 20 of FIGS. 1-7 comprises a pedestal 21 fastened by a plurality of bolts 22 to a truck chassis 23. The pedestal 21 has suitable bearing surfaces 24 and 25 that enable it to be rigidly tightened to the truck chassis 23, and has suitable stiffening flanges 26. At its lower end, the pedestal 21 has a flat lower side 27 having a transverse recess 28 against which the upper plate 29 of a cast bracket 30 is mounted. The cast bracket 30 has a flat ringed end 31 and is fastened to the pedestal 21 by a plurality of bolts 32.

The cast bracket 30 rests upon and is welded to a trunnion shaft 34 that extends the width of the truck body with its flat ringed end 31 surrounding the shaft 34. As shown in FIG. 5, the trunnion shaft 34 is hollow and has an internal end plate 35 welded in place.

A bushing assembly 37 is mounted on the trunnion shaft 34 outwardly of the cast bracket 30. The bushing assembly 37 includes a trunnion cap 40 mounted onto the end of the trunnion shaft 34 by a bolt 41 that extends through the trunnion cap 40 and the end plate 35. The section 42 of the bolt 41 that is journaled in the end plate 35 is eccentric relative to the shank of the bolt. The trunnion cap 40 has a radially outwardly extending flange 43 with a grooved face 44. The rubber bushing 45 is mounted on and adhered to the trunnion shaft 34 between the grooved face 44 of the end cap 40 and the flat ringed end 31 of the cast bracket 30. A metal sleeve or housing 46 is adhered to and surrounds the rubber bushing 45, and is positioned between the ringed end 31 of the cast bracket 30 and the annular flange 43 of the end cap 40, restricting axial movement relative to the trunnion shaft 34. A filler ring 47 is inserted between the shaft of the bolt 41 and the trunnion cap 40. A pair of nuts 48 are used to tighten the bolt 41 in place.

A compensator 49 comprises an inverted U-shaped channel member having a top 50 and sides 51 and 52. The compensator 49 is mounted on the sleeve 46 with the sleeve 46 extending through openings 53 and 54 in the sides 51 and 52. The compensator 49 is reinforced by a pair of plates 55 and 56 welded to the sides 51 and 52 and also to the sleeve 46. The lower edges of the channel member 49 have central flanges 58 that are horizontal and are joined to forward and rearward upwardly inclined flanges 59 and 60.

A pair of torque beams 62 and 63 preferably in the form of I-beams are pivotally connected to the channel member 49 by bushing assemblies 64 and 65. Each I-beam 62 and 63 comprises upper and lower horizontal plates 66 and 67 and a central vertical web 68. The axes of the bushing assemblies are below the axis of the bushing assembly 37, preferably by at least 2 inches.

As shown in FIG. 6, each bushing assembly 64 and 65 includes a pair of collars 70 and 71 mounted and welded within the holes 72 and 73 in the plates 55 and 56 and the sides 51 and 52 of the compensator 49. The collar 70 is internally threaded to receive the threaded end 74 of a bolt 75. A metal sleeve 76 is mounted on the bolt 75 between the collars 70 and 71, and a pair of retainer washers 77 and 78 are mounted on the sleeve between the collars 70 and 71. A rubber bushing 79 is mounted on the sleeve 76 between the retainer washers 77 and 78, and another metal sleeve 80 is mounted on the bushing 79. The torque beams 62 and 63 have arcuate slots 82 cut in them to fit around the side of the sleeve 80, and the web 68 at the slots 82, and the upper and lower plates 66 and 67 are welded to the sleeve 80.

The torque beams 62 and 63 extend forwardly and rearwardly, respectively, to a pair of trunnion assemblies 83 and 84. As shown in FIG. 4, each trunnion assemblies 83 and 84 comprises a bracket 85 having an upper concave seat 86 with opposite downwardly extending arms 87 and 88 having openings 89 and 90 in them. A pair of collars 91 and 92 are mounted in the openings 89 and 90, the collars having flanges 93 and 94 to act as stops. The collars are held in place by a bolt 95. A metal sleeve 96 is mounted on the inner ends of the collars 91 and 92, and a rubber bushing 97 is mounted on the sleeve 96. Another metal sleeve 98 is mounted on the bushing 97, with a metal ring 99 being rotatably mounted about the sleeve 98. The upper and lower plates 66 and 67 of the torque beam 63 have spread ends 100 and 101 that are welded to the ring 99.

The concave seat 86 of the bracket 85 corresponding to the trunnion assembly 83 is welded to the front axle 102 of the truck body. Similarly, the concave seat 86 of the bracket 85 corresponding to the trunnion assembly 84 is welded to the rear axle 103.

An elastomer spring 107 is mounted within the compensator 49 between the upper plate 66 of the torque beam 62 and the upper wall 50 of the compensator. A similar elastomer spring 108 is mounted within the compensator 49 between the upper plate 66 of the torque beam 63 and the upper wall 50 of the compensator 49. As shown in FIG. 7, each elastomer spring 107 and 108 comprises a plurality of metal plates 109, 110, 111, 112, 113, 114, 115 and 116 separated by rubber blocks 117 permanently joined and adhered to the plates 109–116 in a stack as illustrated. The upper plate 109 is fastened to the top wall 50 of the compensator 49 by a plurality of cap screws 118, and the lower plate 116 is fastened to the upper plate 66 of the torque beam 63 by a plurality of cap screws 119.

A third elastomer spring 125 is mounted between two brackets 126 and 127. The brackets 126 and 127 are mounted vertically on the top 66 of the torque beams 62 and 63 above the bushing assemblies 64 and 65, respectively. Each bracket has a vertical plate 128, a horizontal plate 129, and a reinforcing web 130. The bottoms of the plate 128 and the web 130 are welded to the tops 66 of the torque beams 62 and 63. The elastomer spring 125 is constructed like the elastomer springs 107 and 108 alternating layers of metal plates 131 and rubber blocks 132, and is mounted horizontally between the plates 128 of the brackets 126 and 127 with stud bolts 133. Sufficient clearance is maintained between the elastomer spring 125 and the bushing assembly 37 and between the top of the brackets 126 and 127 and the top 50 of the compensator 49 to allow for pivoting of the torque beams 62 and 63 in relation to the compensator 49.

OPERATION OF THE EMBODIMENT OF FIGS. 1–7

The suspension assembly 20 shown in FIGS. 1–7 is, of course, duplicated on opposite sides of the truck chassis 23, with the trunnion shaft 34 extending the width of the truck and being common for both suspension assemblies, and with axles 102 and 103, as well as the chassis 23, being similarly connected to both assemblies.

The functions of the suspension assemblies 20 are to resiliently support varying total loads carried by the vehicle body above the vehicle chassis 23, to respond to uneven distributions of loads either forwardly or rearwardly of the vehicle chassis, compensating for such uneven distribution and distributing such loads substantially equally to both axles 102 and 103, and to react to and dampen individual shock forces applied to either axle 102 or 103 by rough or uneven spots in the roadway.

In addition, as has been said, the use of the resilient bushings 64 and 65 and the resilient trunnions or bushings 83 and 84 permits limited lateral turning of the torque beams 62 and 63 relative to the compensator 49, and limited lateral turning of the axles 102 and 103 relative to the torque beams 62 and 63. Also, the resilient bushing 37 permits limited lateral turning of the compensator 49 relative to the trunnion shaft 34. As a result, when the truck turns a corner, the wheels carried by the axles 102 and 103 can and do track with the turn. This eliminates skidding of the tires on the roadway and gives the driver better control of the truck or trailer.

Assume first that an uneven distribution of load is carried by the vehicle chassis 23. With an even load, there is virtually no tendency of the truck chassis 23 to swing downwardly at either its forward or rearward end to rock the pedestal 21 and apply a torsional load to the bushing assembly 37. The applied load is vertical, and the vertical load is transmitted through the pedestal, the trunnion shaft 34, and the bushing assembly 37 into a vertical downward force on the compensator 49. As the compensator 49 moves downwardly under the vertical load, it applies pressure to the upper sides of the elastomer springs 107 and 108 and, at the same time, moves the bushing assemblies 64 and 65 downwardly. Since the axles 102 and 103 are substantially immovable because the tires they support rest upon the immovable roadway, downward movement of the channel member 49 produces clockwise rotation of the torque beam 62 about the bushing assembly 64 and counterclockwise rotation of the torque beam 63 about the bushing 65, as viewed in FIG. 2. This combined action produces net compressive forces against the upper and lower sides of the elastomer springs 107 and 108 and each end of the elastomer spring 125, all of which compress somewhat but, at the same time, absorb the variations in load carried by the truck chassis.

There is a similar action when one of the axles 102 or 103 is bounced upwardly by an unevenness in the roadway. For example, if the axle 102 moves upwardly, it swings the torque beam 62 in a clockwise direction about the bushing 64, tending to compress the elastomer spring 107, and the elastomer spring 125 in the rearward direction. The elastomer springs 107 and 125 react with a force tending to rotate the compensator 49 in a clockwise direction to rotate the pedestal 21 and the vehicle chassis 23 in a clockwise direction. However, as soon as the compensator starts to rotate in a clockwise direction, it depresses the bushing assembly 65 to create an upward movement of the torque beam 63 applying an upward pressure against the elastomer spring 108, and a forward pressure against the elastomer spring 125, while the upper side 50 of the compensator 49 applies a downward pressure against the elastomer spring 108. The resulting compression of the elastomer spring 108 and forward compression of the elastomer spring 125 are in reaction to the compression of the elastomer spring 107 and rearward compression of the elastomer spring 125 and tend to equalize the orientation of the compensator 49 and maintain the vehicle chassis 23 level.

It will be noted that although the suspension assembly 20 compensates for the different kinds of loads in an effective and versatile way, the suspension assembly 20 is of relatively lightweight construction while still maintaining superior strength characteristics. In particular, it will be noted that the use of the I-beams 62 and 63 provides lightweight and yet strong arms leading from the axle brackets 85 to the channel member 49.

A feature of this invention is the formation of the bolt 41 that supports the compensator 49. Since the bolt 41 has the eccentric 42, the bolt can be loosened and rotated to balance the compensator.

DESCRIPTION OF FIGS. 8 and 9

Another embodiment of the invention is shown in FIGS. 8 and 9 of the drawings. This embodiment is similar to the one first described except that a center metal plate 140 of the elastomer spring 141 is somewhat longer than the other plates 131. The center metal plate 140 is welded to the top 50 and sides 51 and 52 of the compensator 49. The spring halves 142 and 143 of the spring 141 now effectively act as two separate springs. With the center metal plate 140 welded to the compensator 49 as described, upward movement of the torque beam 62 causes the elastomer spring 107 and the half 142 of the spring 141 to compress and tend to rotate the compensator 49 in a clockwise direction, resulting in a depression of the bushing assembly 65 as before. However, in this embodiment, there is no direct translation of force through the elastomer spring 141 directly to the torque beam 63. Depression of the bushing assembly 65 creates an upward movement of the torque beam 63 applying an upward pressure against the elastomer spring 108, and a compression of the half 143 of the elastomer spring 141. The resulting compression of the elastomer springs 108 and 143 is in reaction to the compression of the elastomer spring 107 and 142 with an equalizing effect on the compensator 49, maintaining the vehicle chassis 23 level.

DESCRIPTION OF FIGS. 10 AND 11

Another embodiment of the invention is shown in FIGS. 10 and 11 of the drawings. This embodiment of the invention utilizes most of the same parts of the two previously described embodiments, the major change being in the substitution of a dual acting air spring 150 for the elastomer spring 125. Brackets 151 and 152 are mounted on the top 66 of the torque beams 62 and 63, and include vertical plates 153 with reinforcing webs 154 and 155 welded thereto. The bottom of the vertical plates 153 and the reinforcing webs 154 and 155 are welded to the top 66 of the torque beams 62 and 63 as shown in FIG. 10. The air spring 150 is mounted between the vertical plates 153 with conventional mounting brackets 156. The operation of this embodiment is the same as that of the first described embodiment.

DESCRIPTION OF FIG. 12

Still another embodiment of the invention is shown in FIG. 12 of the drawing. This embodiment is a combination of the last two described embodiments of the invention is that two dual action air springs are substituted for the two halves 142 and 143 of the elastomer spring 141. In this embodiment a vertical plate 160 is welded to the top 50 and the sides 51 and 52 of the compensator 49 directly over the axis of the bushing assembly 37. An air spring 161 is mounted horizontally between the vertical plate 153 of the bracket 151 and the vertical plate 160, and an air spring 162 is mounted horizontally between the vertical plate 153 of the bracket 152 and the vertical plate 160. The mounting of the air springs 161 and 162 is accomplished with conventional mounting brackets 163. The operation of this embodiment is the same as that of the second described embodiment.

What is claimed is:
1. A vehicle suspension assembly comprising a pedestal adapted to be suspended from a vehicle chassis between two axles of the vehicle, a compensator block, means for connecting the compensator block to the pedestal for oscillating movement of the compensator block relative to the pedestal about an axis parallel to the axles of the vehicle, a forward beam, means for pivotally connecting one end of the forward beam to the compensator block and pivotal linkage means for connecting the other end of the forward beam to the front one of the two vehicle axles, a rearward beam, means for pivotally connecting one end of the rearward beam to the compensator block and pivotal linkage means for connecting the other end of the rearward beam to the rear one of the two vehicle axles, a horizontal compression spring positioned above the beams, means for connecting one end of the horizontal compression spring to the forward beam, means for connecting the other end of the horizontal compression spring to the rearward beam, the pivotal connections of the beams being below the connecting means between the compensator block and the pedestal.

2. The vehicle suspension assembly of claim 1 wherein the horizontal compression spring comprises resilient rubber sandwich layers.

3. The vehicle suspension assembly of claim 1 wherein the horizontal compression spring is a dual action air spring.

4. The vehicle suspension assembly of claim 2 wherein a center metal plate of the horizontal compression spring is connected to the compensator block.

5. The vehicle suspension assembly of claim 1 wherein the horizontal compression spring comprises two dual action air springs, one air spring connected between one side of a center plate and the horizontal spring forward connecting means, and the other air spring connected between the other side of the center plate and the horizontal spring rearward connecting means, the center plate being connected to the compensator block.

6. The vehicle suspension assembly of claim 1 wherein the connecting means between the compensator and the pedestal comprises a rotary eccentric for changing the oscillatory axis of the compensator relative to the pedestal.

7. The vehicle suspension assembly of claim 1 wherein the beams comprise I-beams.

8. The vehicle suspension assembly of claim 1 including forward compression spring means between the forward beam and the compensator, rearward compression spring means between the rearward beam and the compensator, the forward and rearward compression spring means biasing the adjacent beam in a downward direction and the compensator block in an upward direction.

* * * * *